United States Patent [19]

Slattery

[11] Patent Number: 4,920,936

[45] Date of Patent: May 1, 1990

[54] MARINE OUTBOARD DRIVE WITH OIL TANK DRAW TUBE AND INDICATOR

[75] Inventor: Gordon C. Slattery, Omro, Wis.

[73] Assignee: Brunswick Corporation, Skokie, Ill.

[21] Appl. No.: 360,274

[22] Filed: Jun. 2, 1989

[51] Int. Cl.$^5$ ............................................. F01M 1/00
[52] U.S. Cl. ........................... 123/196 S; 123/73 AD
[58] Field of Search .......... 123/196 R, 196 S, 73 AD; 184/108

[56]  References Cited

U.S. PATENT DOCUMENTS

| | | | |
|---|---|---|---|
| 4,709,671 | 12/1987 | Sumigawa | 123/196 S |
| 4,745,893 | 5/1988 | Atherton et al. | 123/196 S |
| 4,766,860 | 8/1988 | Abe et al. | 123/73 AD |
| 4,794,897 | 1/1989 | Kinouchi | 123/196 S |
| 4,800,854 | 1/1989 | Slattery | 123/195 P |

OTHER PUBLICATIONS

Mercury Marine, Brunswick Corp., Quicksilver Parts Catalog, 90-18583, pp. 2, 3, Sep. 1987.

*Primary Examiner*—E. Rollins Cross
*Attorney, Agent, or Firm*—Andrus, Sceales, Starke & Sawall

[57] ABSTRACT

A marine outboard drive unit (10) includes a two-cycle internal combustion engine (14), an oil storage tank (30) storing lubricating oil for the engine, and an assembly (44) mounted to the tank and extending into the tank for drawing oil from the tank and indicating the amount of oil in the tank. The assembly includes a collar (60) mounted to the tank in a top opening (42) and having first and second tubular portions (62, 64) extending integrally downwardly therefrom. The first tubular portion (62) is connected through a flexible coupling (80) to a lower tubular portion (78) formed on the outer surface of a cup member (74) mounted to the second tubular portion (64). The second tubular portion (64) retains an annular float member (66) and magnet (112) therearound in the annular space (76) between the second tubular portion (64) and the cup member (74). The second tubular portion (64) is hollow and houses and isolates a pair of electric wires and a reed switch (102) magnetically actuated by the float (66) and magnet (112).

22 Claims, 2 Drawing Sheets

MARINE OUTBOARD DRIVE WITH OIL TANK DRAW TUBE AND INDICATOR

BACKGROUND AND SUMMARY

The invention relates to marine outboard drive units with a two-cycle internal combustion engine, and more particularly to an assembly mounted in an oil tank for drawing oil from the tank and indicating the amount of oil in the tank.

In various marine outboard drive units having a two-cycle internal combustion engine, it is desirable to provide an automatic oil-fuel mixing system, eliminating the need to manually pre-mix the oil and fuel. The automatic system draws oil from an oil tank and fuel from a fuel tank, and mixes the oil and fuel in a desired ratio. In other applications, it is desirable to provide oil injection. The present invention provides an assembly for drawing oil from the tank and indicating the amount of oil in the tank.

The invention is particularly useful in combination with the oil tank of copending application Ser. No. 360273, filed on even date herewith, entitled "Marine Outboard Driven With Oil Tank", and with the fill tube of copending application Ser. No. 360272, filed on even date herewith, entitled "Marine Outboard Drive With Oil Tank Fill Tube" and with the oil pump of copending application Ser. No. 360265, filed on even date herewith, entitled "Oil Metering Pump With Air Purge".

DETAILED DESCRIPTION

Figure 1:
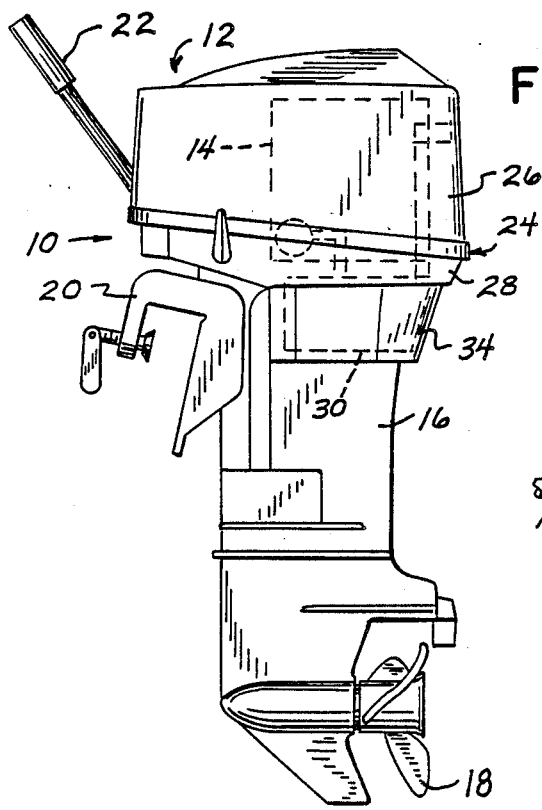
FIG. 1 is a side elevation view of a marine outboard drive unit in accordance with the invention.

FIG. 1 shows a marine outboard drive unit 10 having a powerhead 12 including a two-cycle internal combustion engine 14 and having a lower depending driveshaft housing 16 extending downwardly from the powerhead and having a lower submerged propeller 18. The unit is mounted to the transom of a boat by transom bracket 20, and is steered by tiller handle 22. Cowl 24 encloses engine 14, and includes an upper cowl section 26 and a lower cowl section 28, for example as shown in U.S. Pat. No. 4,800,854, incorporated herein by reference, and in Mercury Marine, Brunswick Corp., Quicksilver Parts Catalog, 90-18583, pages 2, 3, Sept. 1987.

Figure 2:
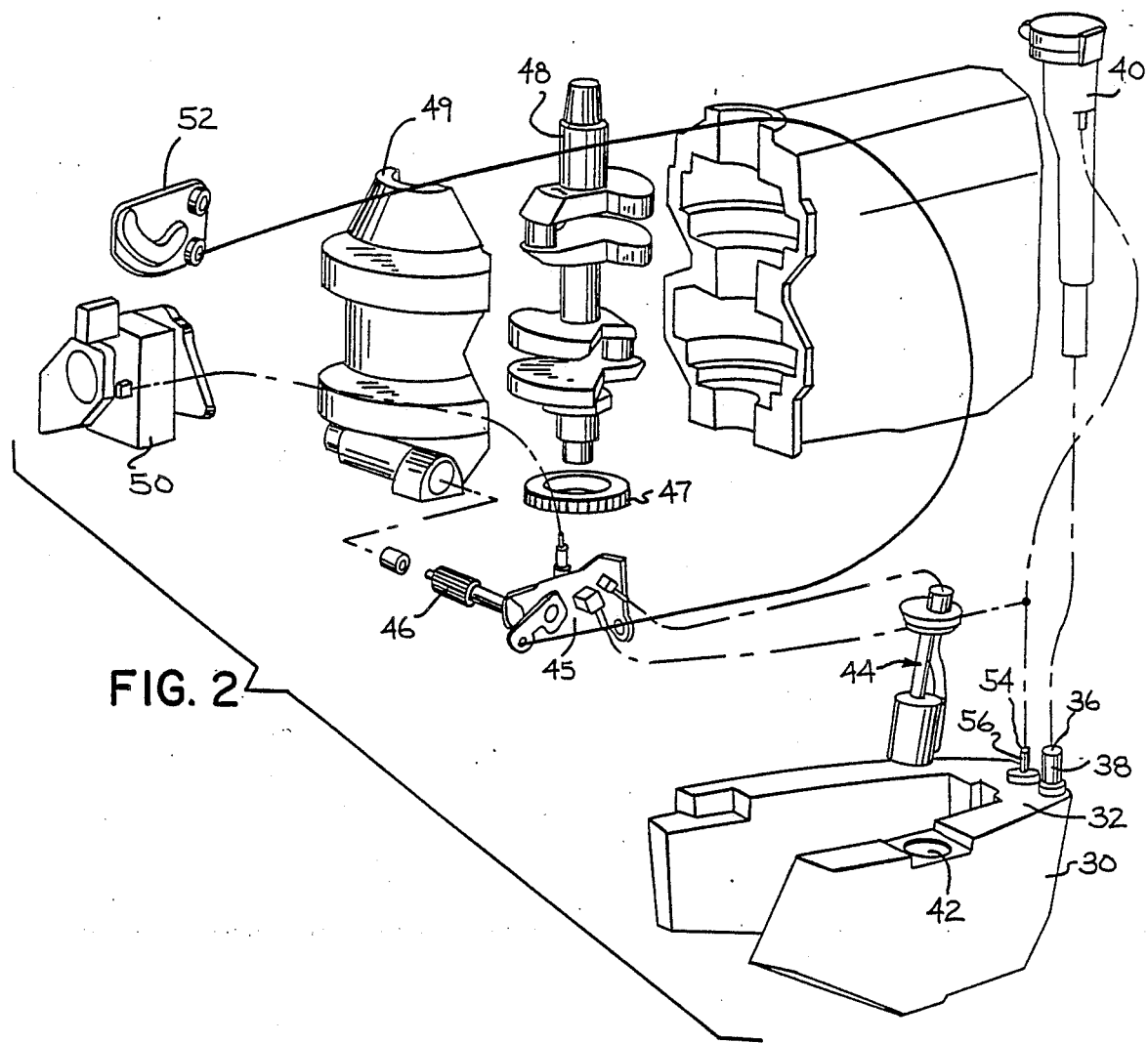
FIG. 2 is a perspective view of an oil-fuel mixing system using the draw tube and indicator of the present invention.

A molded plastic oil tank 30, FIGS. 1 and 2, is mounted adjacent driveshaft housing 16 below powerhead 12. Oil tank 30 is the subject of above noted copending application Ser. No. 360273, filed on even date herewith, entitled "Marine Outboard Drive With Oil Tank". Oil tank 30 has a U-shape when viewed from above, and extends partially around and conforms to driveshaft housing 16. The bight 32 of the U-shape is aft. A trim cover 34 extends downwardly from the cowl lower portion 28 and is spaced outwardly from driveshaft housing 16. Oil tank 30 is in the space between trim cover 34 and driveshaft housing 16.

Oil tank 30 has a first aperture 36, FIG. 2, with an upstanding fitting 38 for filling the tank with oil, for example from a fill tube 40 within cowl 24. Fill tube 40 is the subject of above noted copending application Ser. No. 360272, filed on even date herewith, entitled "Marine Outboard Drive With Oil Tank Fill Tube". Tank 30 has a second aperture 42 in the top thereof for receiving the assembly 44 of the present invention, to be described, for drawing oil from the tank and for indicating oil level in the tank. The oil is drawn by an oil pump 45 which is the subject of above noted copending application Ser. No. 360265, filed on even date herewith, entitled "Oil Metering Pump With Air Purge". Pump 45 has a gear 46 driven by a gear 47 on engine crankshaft 48 in crankcase 49 and pumps oil to carburetor 50 as controlled by throttle 52. Tank 30 has a third aperture 54 with an upstanding fitting 56 providing a vent for the tank and receiving overflow from pump 45.

Figure 3:
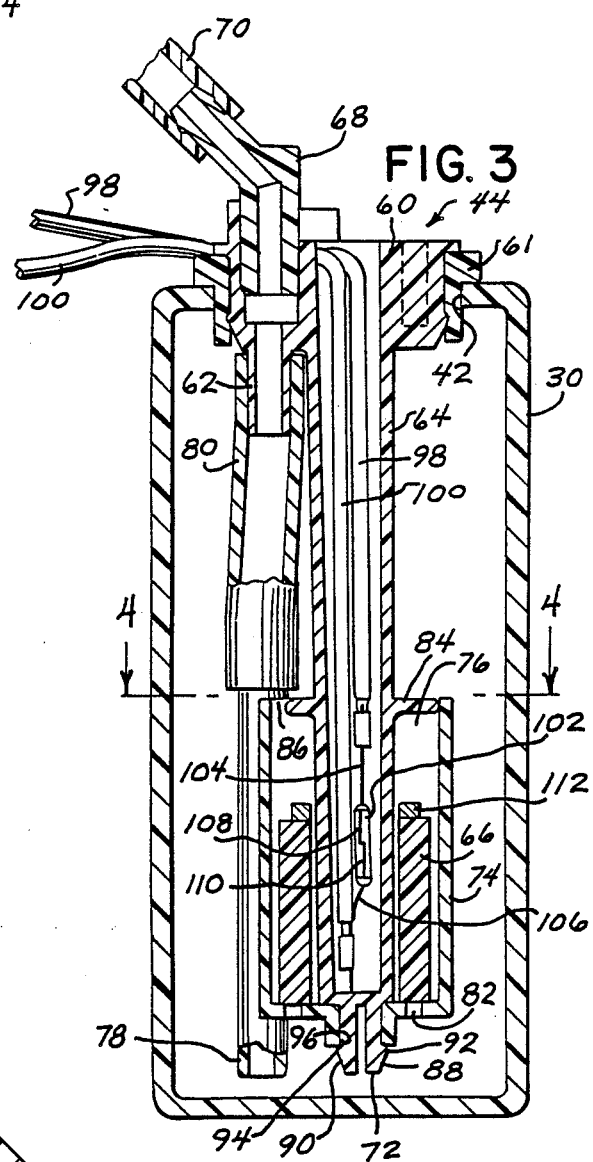
FIG. 3 is an enlarged sectional view of a portion of FIG. 1.
Figure 4:
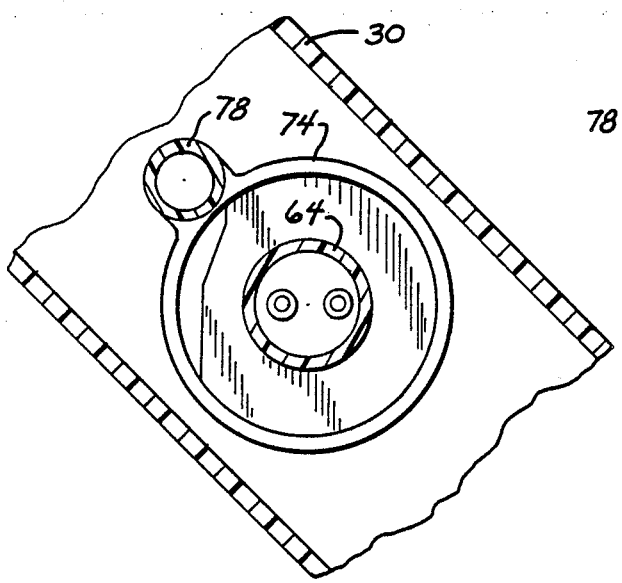
FIG. 4 is a sectional view taken along line 4—4 of FIG. 3.

FIG. 3 shows assembly 44 mounted in aperture 42 in tank 30. The assembly includes a collar 60 and gasket 61 mounted to tank 30 in opening 42 in tight press fit relation. Collar 60 has first and second tubular portions 62 and 64 extending integrally downwardly therefrom. First tubular portion 62 provides a draw tube for drawing oil from the tank. Second tubular portion 64 retains a float member 66 which floats on the oil in the tank and provides an indication of oil level in the tank. Collar 60 has a fitting 68 extending upwardly therefrom and is connected to hose 70 which is connected to oil pump 45. Second tubular portion 64 extends downwardly and terminates at a point 72 substantially below first tubular portion 62. A cup member 74 is mounted around second tubular portion 64 at a point spaced below first tubular portion 62 and defines an annular space 76. Float member 66 is an annular float around second tubular portion 64 in annular space 76 between second tubular portion 64 and cup member 74. Annular float 66 is vertically slidable along second tubular portion 64 within cup member 74. Cup member 74 includes a tubular portion 78 thereon, FIGS. 3 and 4, outward of annular space 76 and spaced below first tubular portion 62 of collar 60. A flexible hose or tubular coupling 80 extends between first tubular portion 62 of collar 60 and tubular portion 78 on cup member 74. Tubular portion 62, coupling 80 and tubular portion 78 provide the draw tube for the assembly extending downwardly into the tank to a point proximate the bottom of the tank. Hose 70 is connected to the suction side of oil pump 45 such that the latter draws oil from tank 30 through tubular portion 78, tubular coupling 80, tubular portion 62, fitting 68 and hose 70.

Cup member 74 has one or more apertures 82 in the bottom thereof communicating oil from tank 30 to annular space 76 such that float 66 floats on the oil in annular space 76. Tubular portion 64 has a flange 84 extending laterally radially outwardly therefrom toward cup member 74 proximate the top of the cup member. A top opening 86 is left between flange 84 and cup member 74 above float 66 such that oil may flow therethrough. Tubular portion 64 at bottom end 72 has a pair of spaced tines 88 and 90 deflectable toward each other and having outer shoulders 92 and 94. Cup member 74 has a central aperture 96 on its bottom surface slidable over tines 88 and 90 to deflect the tines laterally towards each other until shoulders 92 and 94 engage the bottom of cup member 74 in snap lock relation to mount the cup member to tubular portion 64.

Tubular portion 64 is hollow and has a closed bottom and houses a pair of electrical wires 98 and 100 and an electric switch 102 and isolates the wires and the switch from the oil in tank 30. Switch 102 has a pair of terminals 104 and 106 connected to respective wires 98 and 100. Switch 102 is actuated by float 66 to complete an electric circuit between wires 98 and 100 in response to a given oil level in tank 30 and annular space 76. Switch 102 is a reed switch having a pair of generally vertically extending reeds 108 and 110 movable in a generally horizontal direction toward and away from each other to make and break contact with each other, respectively. The switch is magnetically actuated. Float 66 includes an annular magnet 112 around tubular portion 64 and slidable therealong. Wires 98 and 100 are connected to a voltage source and a visual or audible alarm, such as a light or a buzzer, to warn of a low oil level condition when float 66 and magnet 12 slide downwardly such that magnet 112 actuates reed switch 102 to a closed condition to complete the electric circuit.

It is recognized that various equivalents alternative and modifications are possible within the scope of the appended claims.

I claim:

1. A marine outboard drive unit having a two-cycle internal combustion engine, an oil storage tank storing lubricating oil for said engine, an assembly mounted to said tank and extending into said tank for drawing oil from aid tank and indicating the amount of oil in said tank.

2. The invention according to claim 1 wherein said assembly comprises a first tube extending downwardly into said tank to a point proximate the bottom of said tank for drawing oil therefrom, and a second tube extending downwardly into said tank and retaining a float member which floats on said oil in said tank and provides an indication of oil level in said tank.

3. The invention according to claim 2 wherein said second tube houses a pair of electrical wires extending downwardly therein and an electric switch having a pair of terminals connected to respective said wires and actuated by said float to complete an electric circuit between said wires in response to a given oil level in said tank.

4. The invention according to claim 3 wherein said switch is magnetically actuated, and wherein said float comprises a magnet.

5. The invention according to claim 4 wherein said switch comprises a reed switch with a pair of generally vertically extending reeds movable in a generally horizontal direction toward and away from each other in response to movement of said magnet.

6. The invention according to claim 4 wherein said magnet comprises an annular member around said second tube and slidable therealong.

7. A marine outboard drive unit having a two-cycle internal combustion engine, an oil storage tank storing lubricating oil for said engine and having an opening in the top thereof, an assembly comprising a collar mounted to said tank in said opening and having first and second tubular portions extending integrally downwardly therefrom, said first tubular portion providing a draw tube for drawing oil from said tank, said second tubular portion retaining a float member which floats on said oil in said tank and provides an indication of oil level in said tank.

8. The invention according to claim 7 wherein said collar has a fitting extending upwardly therefrom and communicating with said first tubular portion.

9. The invention according to claim 7 wherein said second tubular portion extends downwardly and terminates at a point substantially below said first tubular portion, and comprising a cup member mounted around said second tubular portion at a point spaced below said first tubular portion and defining an annular space between said second tubular portion and said cup member, and wherein said float member comprises an annular float around said second tubular portion in said annular space between said second tubular portion and said cup member and slidable along said second tubular portion, and wherein said cup member comprises a tubular portion thereon outward of said annular space and spaced below said first tubular portion of said collar, and further comprising a tubular coupling between said first tubular portion of said collar and said tubular portion on said cup member.

10. A marine outboard drive unit having a two-cycle internal combustion engine, an oil storage tank storing lubricating oil for said engine, an indicator assembly mounted to said tank and extending into said tank and indicating the amount of oil in said tank comprising a tube extending into said tank, a cup around said tube and defining an annular space between said cup and said tube, a float retained in said annular space between said cup and said tube and floating on said oil in said tank and providing an indication of oil level in said tank.

11. The invention according to claim 10 wherein said float is an annular member.

12. The invention according to claim 10 comprising at least one aperture in said cup communicating oil from said tank to said annular space such that said float floats on said oil in said annular space.

13. The invention according to claim 12 wherein said opening is in the bottom of said cup below said float, and further comprising a top opening between said cup and said tube above said float.

14. The invention according to claim 10 wherein said tube is hollow and houses a pair of electrical wires therein and an electric switch having a pair of terminals connected to respective said wires and actuated by said float to complete an electric circuit between said wires in response to a given oil level in said tank.

15. The invention according to claim 14 wherein said switch is magnetically actuated, and said float comprises a magnet slidable along said tube in said annular space between said tube and said cup.

16. The invention according to claim 10 wherein said tube has a bottom end with a pair of spaced tines deflectable toward each other and having outer shoulders, and wherein said cup has a central aperture on its bottom surface slidable over said tines to deflect said tines laterally towards each other until said shoulders of said tines engage the bottom of said cup in snap lock relation to mount said cup to said tube.

17. The invention according to claim 10 wherein said tube has a flange extending laterally radially outwardly therefrom toward said cup proximate the top of said cup.

18. A marine outboard drive unit having a powerhead with a two-cycle internal combustion engine and a driveshaft housing extending downwardly from said power head and having a lower submerged propeller, a cowl enclosing said engine, an oil storage tank mounted adjacent said driveshaft housing below said cowl and storing lubricating oil for said engine, an assembly mounted to said tank below said cowl and extending downwardly into said tank and having a first tubular portion for drawing oil from said tank and having a second tubular portion housing and retaining an indication mechanism for indicating the amount of oil in said tank.

19. The invention according to claim 18 wherein said assembly comprises an upper collar mounted to said tank and having first and second tubular portions extending integrally downwardly therefrom, and wherein said second tubular portion extends integrally downwardly to a lower tubular portion having an annular float slidable therealong, a cup member mounted to said lower portion of said second tubular portion and defining an annular space therebetween retaining and guiding said float.

20. The invention according to claim 19 wherein said cup member has an outer tubular passage integrally formed thereon and spaced below said first tubular portion of said collar, and comprising a tubular coupling connecting said first tubular portion of said collar to said outer tubular portion of said cup member.

21. The invention according to claim 18 wherein said assembly is a unitary assembly lowered into said tank through a top opening therein below said cowl.

22. The invention according to claim 18 wherein said second tubular portion is hollow and receives electrical wires for said indication mechanism and isolates said wires from the oil in said tank.

* * * * *